Oct. 26, 1926.

W. UPTON

RULER

Filed Oct. 4, 1924

1,604,504

WALTER UPTON
INVENTOR

BY

HIS ATTORNEY.

Patented Oct. 26, 1926.

1,604,504

UNITED STATES PATENT OFFICE.

WALTER UPTON, OF SOUTH BANK, ENGLAND.

RULER.

Application filed October 4, 1924, Serial No. 741,554, and in Great Britain August 26, 1924.

This invention relates to rulers and has for its object to provide an improved ruler which shall be smooth of movement, accurate and efficient, for example for office work.

An improved ruler made in accordance with this invention is characterized by one or more rollers adapted to run on supports or bearings of spherical or spheroidal or similar shape, such as ellipsoidal, or segmental parts thereof, in a sheath.

The accompanying drawings illustrate by way of example various forms of device made in accordance with this invention.

In the drawings:—

Figure 1:
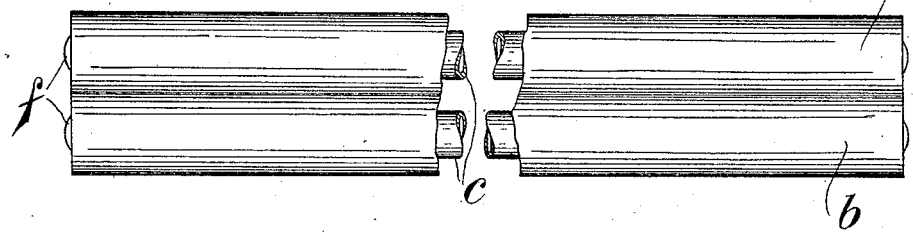
Fig. 1 is a plan of one form.
Figure 2:
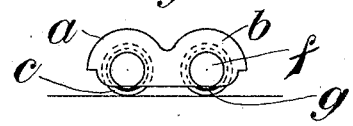
Fig. 2 is an end view.
Figure 3:
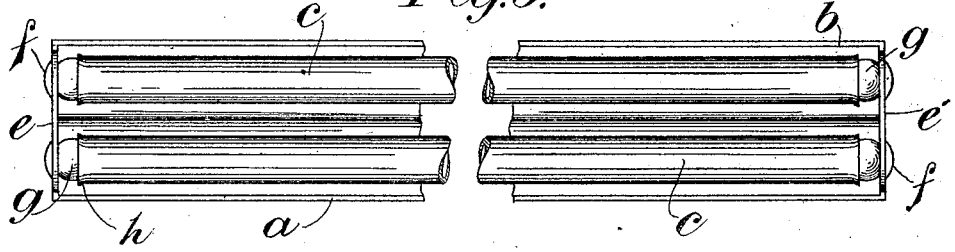
Fig. 3 is an inverted plan thereof.
Figure 4:
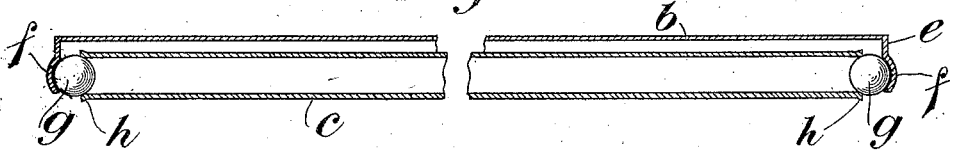
Fig. 4 is a sectional elevation through one roller.

Referring to Figure 1 I provide a metal sheath having two longitudinal corrugations $a, b$ closed at the ends. In these corrugations are disposed tubular or partially hollow metal rollers $c, d$. The closed ends $e$ of the sheath corrugations are slightly recessed or bulged outwards at $f$ preferably spherically. Metal spheres $g$ engage in these recesses or bulges and in the corresponding hollow ends of the rollers and form supports which allow the rollers to revolve with accuracy, freedom and smoothness. The spheres run freely in the recesses in the sheath ends.

Figure 5:
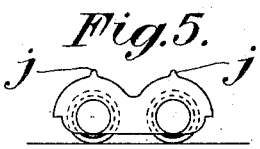
Figs. 5, 6 and 7 are end elevations showing modified forms of sheath.

In Fig. 5 the sheath is provided with ridges $j$ at the top, one over each roller, for convenience in handling and for strengthening the sheath.

Figure 6:
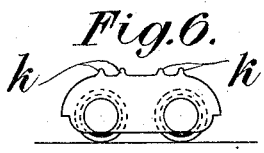

In Fig. 6 two ridges $k$ are provided over each roller on the sheath for a like purpose to those illustrated in Fig. 5.

Figure 7:
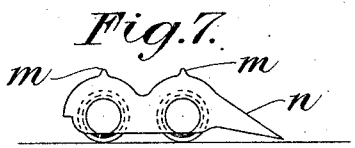
Figure 7:

In Fig. 7 one ridge is provided over each roller for a like purpose to those illustrated in Figs. 5 and 6 and one edge of the sheath projects outwardly as shown at $k$. The ridges may be formed in any suitable manner such as by casting or moulding for example.

In Figs. 5 to 7 it will be noted that one edge of the sheath is substantially in line with the centre line of the rollers.

My improved ruler enables truly parallel lines to be drawn and gives a firm purchase in the handling whilst at the same time it has an easy movement, rendering it practically impossible to get out of line. If the roller is lifted off the paper, the ruling edge is not likely to touch the paper, so that smudging is reduced to a minimum.

What I claim and desire to secure by Letters Patent is:—

1. In a ruler of the character described, the combination of a sheath having recessed ends, and a hollow roller having spherical supports in said recessed ends.

2. In a ruler of the character described, the combination of a sheath having recessed ends, a tubular roller arranged in said sheath and spheres between the recessed ends and the roller ends to support the latter.

3. In a ruler of the character described, the combination of a sheath having recessed ends, parallel tubular rollers arranged in said sheath, and spheres carried by the ends of the rollers and bearing in said recessed ends of the sheath for support.

4. In a ruler of the character described, the combination of a sheath having recessed ends, parallel tubular rollers having spherical supports disposed in said recessed ends.

5. In a ruler of the character described, the combination of a metal corrugated sheath having recessed ends, and sides projecting outwardly and downwardly, tubular rollers arranged in the corrugations, and spherical bearings carried by the ends of the rollers and supported in said recessed ends, said spherical bearings being disposed concentric with longitudinal axes of the corrugations.

In testimony whereof I have signed my name to this specification.

WALTER UPTON.